Jan. 28, 1969 J. L. HATHAWAY 3,424,866

TELEVISION SYNCHRONIZING DELAY COMPENSATION SYSTEM

Filed April 5, 1965 Sheet 1 of 3

INVENTOR.
JARRETT L. HATHAWAY
BY
W. H. Sponagle
Attorney

INVENTOR.
JARRETT L. HATHAWAY
BY
W. A. Sprague
Attorney

TELEVISION SYNCHRONIZING DELAY COMPENSATION SYSTEM

Filed April 5, 1965

INVENTOR.
JARRETT L. HATHAWAY
BY
W. H. Sprague
Attorney

United States Patent Office 3,424,866

Patented Jan. 28, 1969

3,424,866

TELEVISION SYNCHRONIZING DELAY COMPENSATION SYSTEM

Jarrett L. Hathaway, Manhasset, N.Y., assignor to Radio Corporation of America, a corporation of Delaware Filed Apr. 5, 1965, Ser. No. 445,378

U.S. Cl. 178—69.5 11 Claims

Int. Cl. H04l 7/06

ABSTRACT OF THE DISCLOSURE

In a system for synchronizing television signal generating apparatus located at a remote station with signal generating apparatus at a central station, a submultiple frequency signal of a master synchronizing signal generator at the central station is sent via a transmission circuit to signal generating apparatus at the remote station where the submultiple frequency signal is used to phase-lock a slave oscillator having the same frequency as the master synchronizing signal generator. Synchronizing signals derived from the slave oscillator are sent to the central location where they are compared with the central station synchronizing signals on a monitor. Should the compared signals not be time-coincident, the phase of the submultiple frequency signal is changed at the central station, which phase change controls the slave oscillator at the remote station such that the compared synchronizing signals may be made time-coincident at the central station.

This invention relates to television synchronizing systems and particularly to the control of the synchronizing signal generators which respectively govern the operation of the television signal generating apparatus at two or more locations.

The timing of television signal generating apparatus such as a studio or film camera is controlled by pulses derived from a synchronizing signal generator. Such a generator is required to produce synchronizing signals, blanking signals and drive signals respectively at the horizontal and vertical repetition rates. In the case where all of the television signal generating apparatus is in one location, such as within the same building, a single central synchronizing signal generator is used to control all of such signal generating apparatus.

It, however, often is desired to combine the television signals derived from the apparatus at one location with similar signals produced at a different location. The timing of these television signals at a given location must be the same so that they may be properly combined with one another at the given location. In such a case a synchronizing signal generator is included in the apparatus at each location. In a widely used system known as "genlock" it is customary to transmit over a video signal circuit from a master synchronizing signal generator at one location horizontal and vertical synchronizing signals which are employed at a remote location to appropriately synchronize and phase a slave synchronizing signal generator at the remote location.

Sync pulses from the master generator are frequently conveyed over the video circuit in conjunction with picture signals. Such composite transmission requires a means of stripping off the sync pulses for application to the genlock apparatus. In other instances, however, video circuits transmit only the sync pulses to the slave. The genlock system is automatic and has usually been found quite reliable but there are requirements which it sometimes cannot meet, primarily because the sync pulses fall in time coincidence at the remote slave sync generator, not at the control master sync generator. Furthermore, when an extra video circuit is needed for transmission of sync pulses, there is an extra element of expense. As an illustration, consider a camera to be used with such video effects as wipes and dissolves, located a few miles from the main control position. If video circuits are available both to and from the remote apparatus, the remote apparatus can be slaved in a time relationship to the central master apparatus such that the video effects may be added at the remote location. However, such effects should usually be applied at the central control position for most types of field presentation. Consequently, this type of arrangement not only involves the cost of an extra video circuit but is operationally unsatisfactory. As an alternative, the remote sync generator could be used as the master and the composite video signal transmitted to the central control position to lock and slave the central station sync generator. This arrangement would generally be less expensive and more satisfactory than the reverse slaving. Indeed, if only a single remote camera location were involved, it would be difficult to beat. However, if more than one remote camera location were required, it would not work, since the central station sync generator could ordinarily be slaved to only one remote station sync generator.

If, therefore, is an object of the present invention to provide a novel and relatively inexpensive system for controlling the synchronizing signal generators at a plurality of different locations so that the video signals produced at all of the different locations are in time coincidence at one location.

In accordance with an embodiment of the invention, a relatively low frequency (e.g., audible) signal having a sub-harmonic relationship to the horizontal deflection rate is transmitted over an audio frequency circuit from a central master station to a remote slave station in such phase relationship to the sync signals produced at the central master station that the television signals produced at the remote slave station will, when received at the central station from a video frequency circuit, be in time coincidence with television signals produced at the central station. Any number of remote stations may be controlled by respective audible signals phase so that all of the television signals will be received in time coincidence at the master station. Because ordinary audio frequency circuits may be used to convey the audible signals from the master station to a sleeve station, the term "audlok" has been coined to designate the synchronizing system and the signals will be referred to herein as "audlok signals."

An additional feature of the invention is the provision of an alarm system which is responsive to noncoincidence of the master station signals and any of the slave station signals.

For a better understanding of the invention reference may be made to the following description which is given in conjunction with the accompanying drawings of which:

Figure 1:
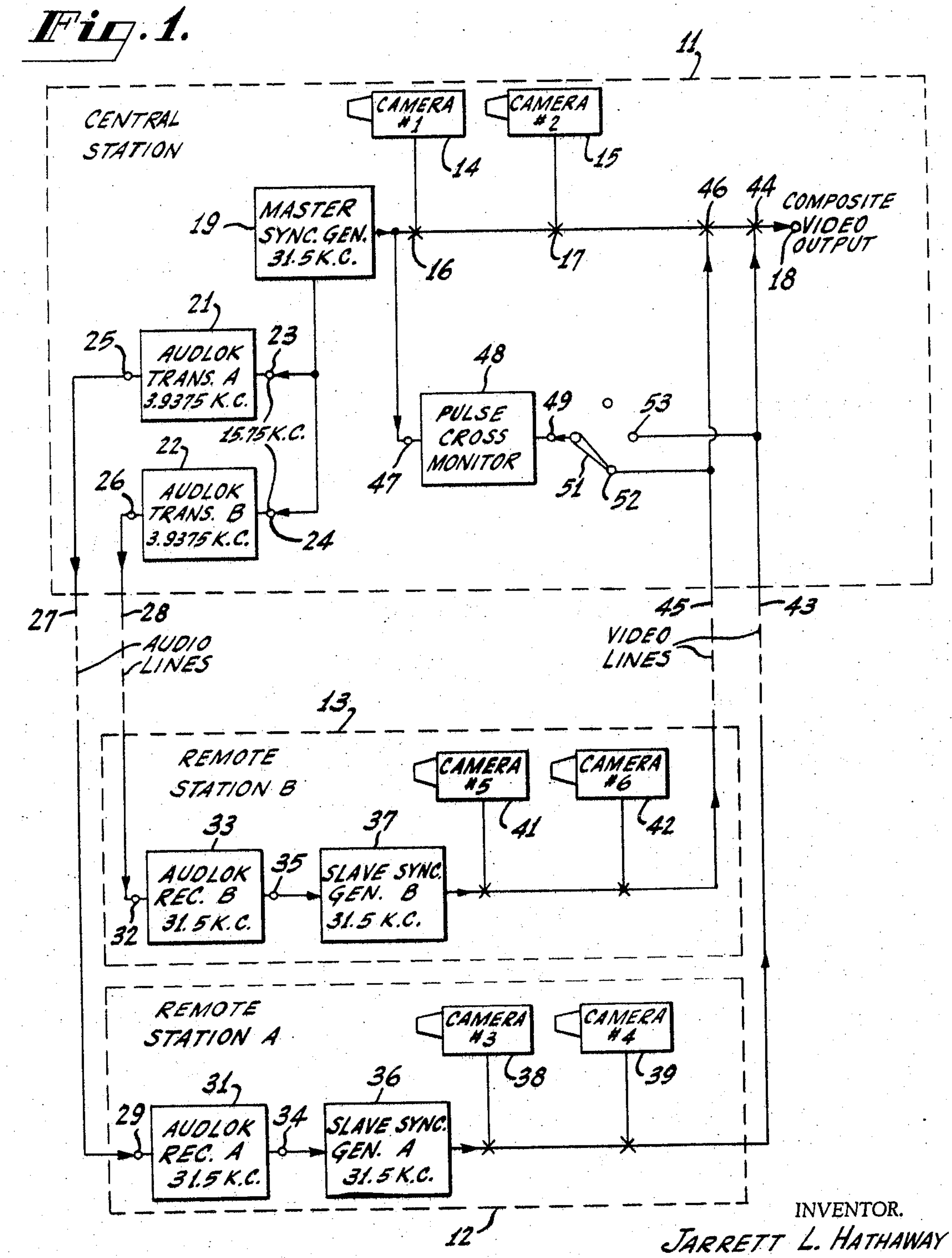
FIGURE 1 is a block diagram of a representative system embodying the invention.

Referring now to FIGURE 1 the general arrangement of a system embodying the present invention will be described in relation to a central station 11 and two remote stations 12 and 13. At the central station, there are shown two cameras 14 and 15 which may be live and/or film cameras. These cameras are indicated as being connectable respectively at cross points 16 and 17 to an output terminal 18. It is to be understood that, in this disclosure, line intersections designated X indicate points at which a connection may be made by suitable switching apparatus. For example, a connection at only one of the cross points 16 and 17 ordinarily is made at a given time. The central station apparatus also includes the master sync generator 19 which includes apparatus by which the various pulses are produced including a train of pulses having the horizontal line repetition rate of 15.75 kilocycles per second. The sync generator is connectable to the cameras 14 and 15 for the usual purpose of supplying these cameras with the necessary horizontal and vertical drive and blanking pulses so that there is produced at the output terminal 18 a composite signal including both video and synchronizing information. The sync generator 19 also is connected to two audlok transmitters 21 and 22 for the purpose of supplying to each of the respective input terminals 23 and 24 thereof a train of horizontal drive pulses at the rate of 15.75 kilocycles per second. Each of the audlok transmitters 21 and 22 includes apparatus which will be described in greater detail subsequently by which the horizontal drive pulses are converted into sinusoidal waves at one-quarter of the horizontal line repetition rate of 3.9375 kilocycles per second. These sinusoidal waves (audlok signals) are produced at the respective output terminals 25 and 26 of the audlok transmitters 21 and 22 in suitable phase and amplitude to effectively synchronize the television signals produced at the remote stations 12 and 13 with those produced at the central station 11.

The audlok signals produced at the output terminals 25 and 26 of the audlok transmitters 21 and 22, respectively, are in the audible frequency range so that they may be transmitted respectively over relatively low frequency responsive channels such as ordinary telephone circuits 27 and 28 to the respective remote stations 12 and 13. At remote station 12, for example, the audlok signal transmitted over audio line 27 is impressed upon an input terminal 29 of an audlok receiver 31. Similarly, the audlok signal transmitted over audio line 28 is impressed upon the input terminal 32 of audlok receiver 33 located in remote station 13.

Each of the audlok receivers 31 and 33 includes apparatus by which the received audlok signals are multiplied by a factor of two and employed to phase lock an oscillator operating at the horizontal line repetition rate of 15.75 kilocycles per second. The output of such an oscillator is doubled in frequency and used to produce a signal having a frequency of 31.5 kilocycles per second which is double the line repetition rate. This double line rate signal is produced at the respective output terminals 34 and 35 of the audlok receivers 31 and 33 at remote stations 12 and 13. The double line rate signals are impressed respectively upon slave sync generators 36 and 37 at the remote stations 12 and 13 so that they are caused to generate properly phased synchronizing, blanking and other pulses necessary for the control of the camera apparatus at these stations.

The slave sync generator 36 at remote station 12 controls the operation of cameras 38 and 39 and the slave sync generator 37 at remote station 13 controls cameras 41 and 42 in the usual manner similar to that at the central station 11. The output from either of the cameras 38 and 39 at remote station 12 is a composite television signal including both video and synchronizing information. Such a signal is transmitted over a relatively high frequency responsive channel, such as a video line 43 to the central station 11 so that it may be applied to the output terminal 18 by suitable operation at the cross point 44. In a similar manner the output of either camera 41 or 42 at remote station 13 is transmitted over the video line 45 to the central station 11 where it may be connected to the output terminal 18 by suitable operation at the cross point 46.

In order that the composite television signal appearing at the output terminal 18 always have the same phase or time relationship irrespective of its origin at any of the cameras at the central station 11 or the remote stations 12 and 13, it is necessary that the synchronizing information sent from the audlok transmitters 21 and 22 be properly phased. In setting up such a system the pulse output from the master sync generator 19 is impressed upon an input terminal 47 of a pulse cross monitor 48 and the pulse output from the slave sync generators 36 and 37 of the remote stations 12 and 13 is impressed upon another input terminal 49 of the monitor 48. The monitor may be Conrac Monitor-Model CPA 14/N. A selector switch 51, when connected to its contact 52, impresses the pulse output from the slave generator 37 of remote station 13 upon the pulse cross monitor input terminal 49 so that the time relationship between the master sync generator pulses impressed upon terminal 47 may be compared with that derived from the slave sync generator 37 of remote station 13. The phase shifting apparatus of audlok transmitter 22 is adjusted until there is exact time coincidence between the two sets of pulses impressed upon the monitor 48. The switch 51 then may be moved to its contact 53 and a similar operation performed by the phase shifting apparatus of the audlok transmitter 21 so as to effect time coincidence between the pulses derived from the master sync. generator 19 and those derived from the slave sync generator 36 of remote station 12.

By means of such an arrangement it, thus, is seen that suitable compensation may be made for the time delays existing between the central station 11 and the two remote stations 12 and 13 with the result that the output from any of the cameras may be applied to the output terminal 18 without any difference in the timing of such signals. Any number of remote stations may be linked to the central station and any desired mixing of the signals derived from the various cameras may be achieved at the central station in the same manner as if all of the signal sources were located at the same place.

Figures 2, 3:
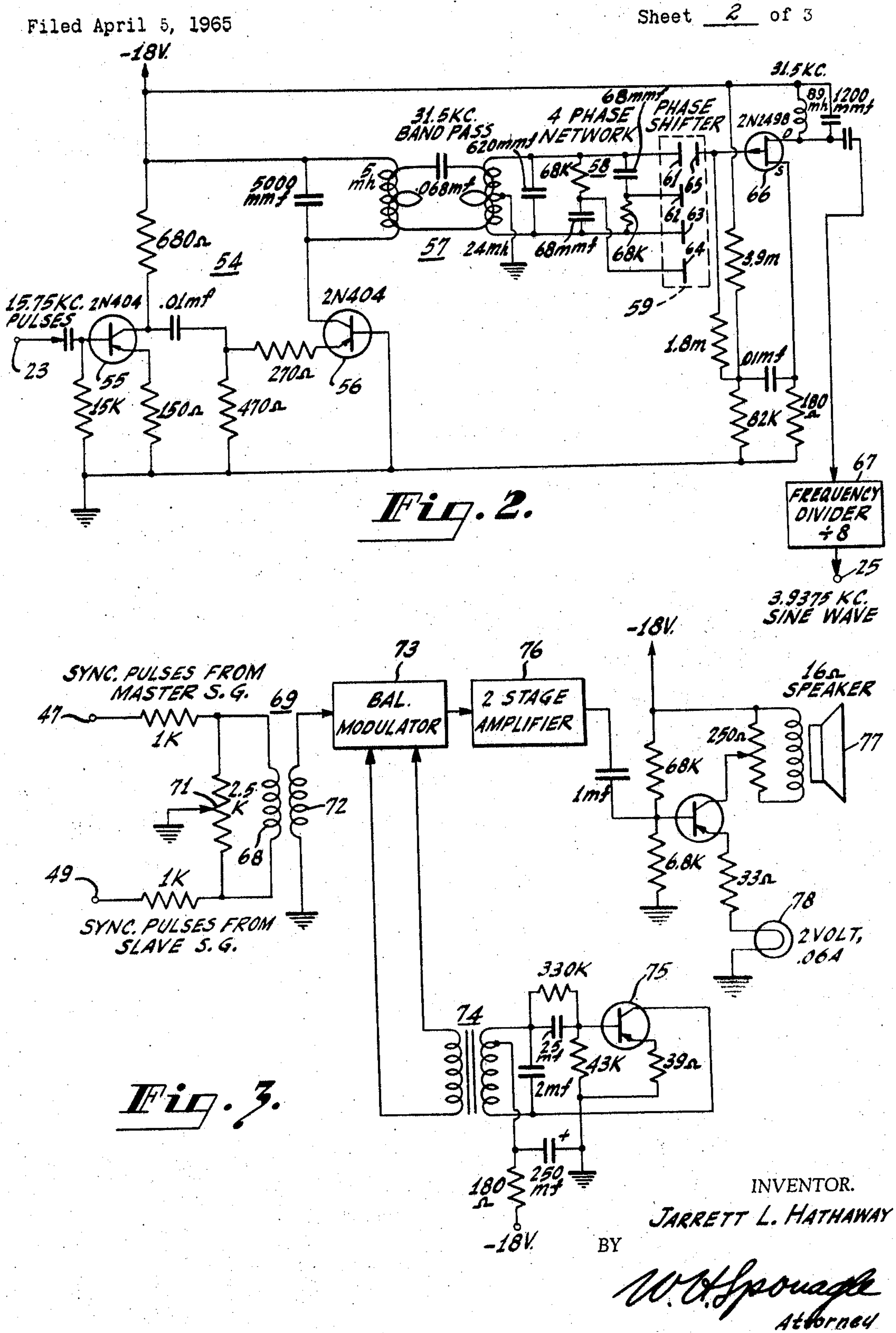
FIGURE 2 is a schematic circuit diagram of the master station audlok signal transmitter apparatus.
FIGURE 3 is a schematic circuit diagram of the master station alarm system.

The essential apparatus of one of the audlok transmitters is shown in FIGURE 2. The horizontal drive pulses at 15.75 kilocycles per second rate applied to the input terminal 23 are amplified in a two-stage pulse amplifier 54 comprising transistors 55 and 56. The pulses are converted by such amplifier and a double tuned transformer 57 to a sinusoidal wave having a 31.5 kilocycle per second frequency. This wave is applied to a four-phase network 58, the four differently phased outputs from which are applied to a phase shifter 59 comprising four stator plates 61, 62, 63 and 64 and a rotor plate 65. The stator plates are mechanically displaced from one another by 90° and supplied with sinusoidal wave voltages derived from the network 58 which are electrically displaced from one another by 90°. The phase shifter 59 in effect constitutes a rotatable capacitor such that, when the rotor plate is adjacent to stator plate 61, it couples a first phase of the sinusoidal wave to the output. Similarly, when the rotor plate 65 is adjacent to stator plate 62 it couples to the output a second phase of the wave which is displaced by 90° from the first phase. At a position midway between any two plates, such as the rotor plates 61 and 62, the rotor plate 65 couples to the output a phase of the sinusoidal wave which is displaced by 45° phase from the first and second phases. By such means, a continuous rotation of the rotor plate 65 produces a sinusoidal wave in its output the phase of which is continuously variable so that any desired phase of the wave may be produced. Rotation of the rotor plate 65 in one direction advances the phase of the sinusoidal wave while rotation in the opposite direction retards the phase of the wave.

The sinusoidal wave having a 31.5 kilocycles per second frequency and a phase determined by the positioning of the rotor plate 65 relative to the stator plates 61, 62, 63 and 64 of the phase shifter 59 is impressed upon an amplifier including a field effects transistor 66, the output of which is coupled to a frequency divider 67. This divider effectively divides the 31.5 kilocycles per second wave by 8 to produce the audlok signal which is a sinusoidal wave at 3.9375 kilocycles per second at the output terminal 25 of the audlok transmitter. As previously described, this wave has a frequency which is one-fourth of the horizontal line repetition rate and is transmitted to the associated remote station, the apparatus of which will be described in detail subsequently.

After the system is in operation and particularly when a number of remote stations are synchronized with the master station apparatus the pulse cross monitor 48 of FIGURE 1 may be replaced by an alarm system so that any noncoincident condition between the central station and any of the remote stations may be detected and the identity of the involved remote station may be determined. FIGURE 3 indicates the apparatus of such an alarm system. Synchronizing pulses from the master sync generator 19 of FIGURE 1 are applied to terminal 47 and synchronizing pulses from a remote station are applied to terminal 49. These two terminals are connected to the terminals of the primary winding 68 of a transformer 69 so that by means of a level balancing potentiometer 71 equal and opposite polarity pulses are produced in the secondary transformer winding 72 when the two sets of sync pulses are similar in every respect such as width, amplitude, time coincidence, etc. Under such conditions no output voltage is produced in the transformer secondary winding 72.

The secondary winding 72 of the transformer 69 is coupled to one input of a balanced modulator 73, another input of which is supplied with alternating current pulses of approximately one kilocycle per second. These pulses, at the rate of about three pulses per second are derived from a transformer 74 which is coupled between the modulator 73 and a squegging type oscillator including a transistor 75. Under the conditions of desired operation in which the two sets of input pulses are, in time coincidence, no output is derived from the demodulator 73. When, however, the two sets of sync pulses are not in time coincidence, an output is produced in the transformer secondary winding 72 which causes an output to be derived from the modulator 73. Such output is amplified by an amplifier 76 and applied to an alarm circuit which includes a loud speaker 77 and a lamp 78. When energized, the loud speaker audibly reproduces the pulses derived from the oscillator and the lamp 78 flashes so as to identify the remote station which is not operating coincidently with the central station.

Figure 4:
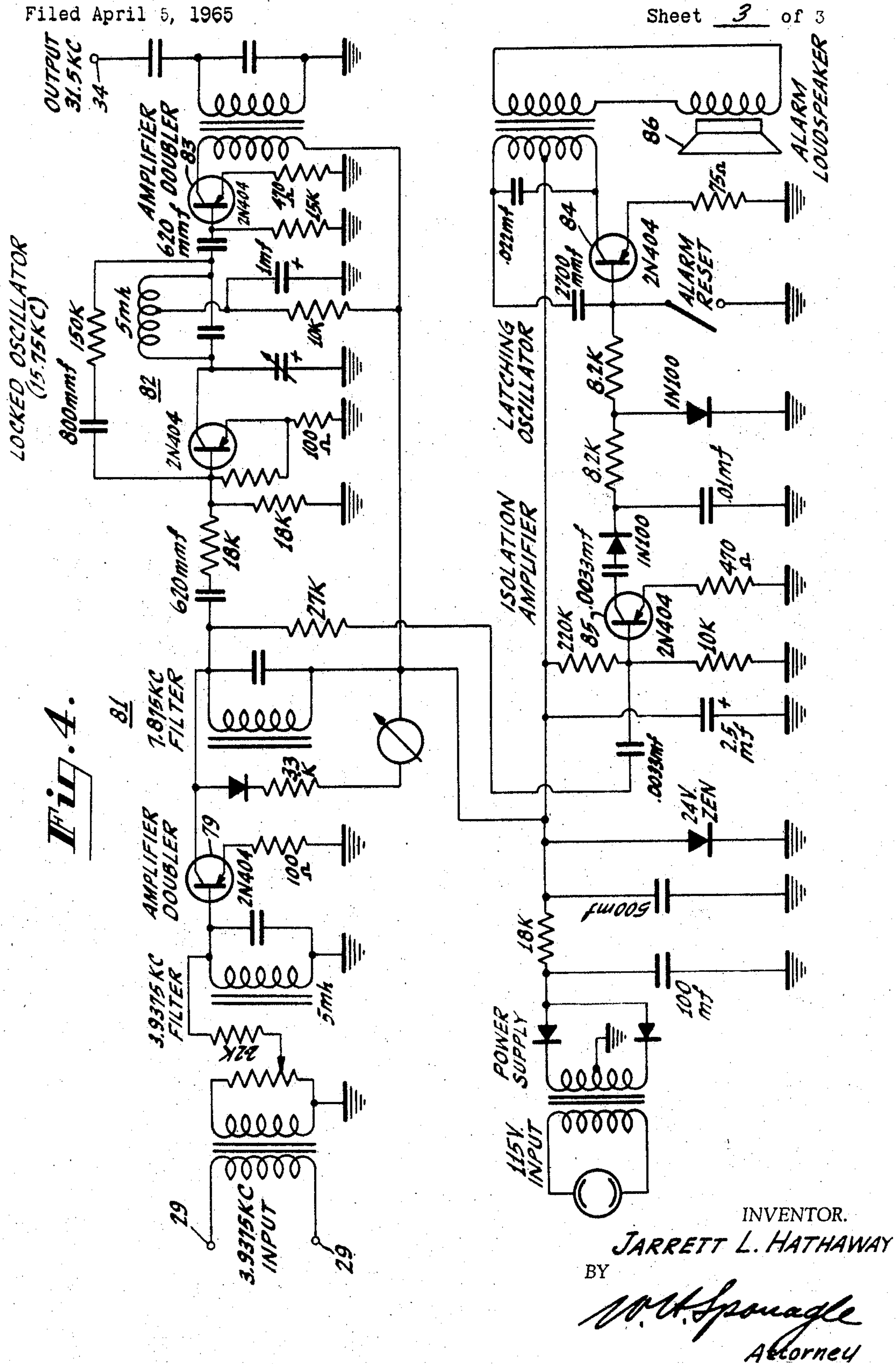
FIGURE 4 is a schematic circuit diagram of the slave station audlok signal receiver apparatus.

FIGURE 4 illustrates the circuits embodied in one of the audlok receivers located at remote station 12, for example. The audlok signal received at the input terminal 29 of the audlok receiver is amplified and doubled in frequency by means including a transistor 79 and a double tuned circuit 81 from which is derived a controlling wave having a frequency of 7.875 kilocycles per second which is one-half of the line repetition rate. Such a wave is applied to a transistorized oscillator 82, the natural frequency of which is 15.75 kilocycles per second which is the horizontal line repetition rate. The injection of the half frequency controlling wave upon this ocsillator from the double tuned circuit 81 effectively locks this ocsillator in a desired phase relation to the audlok signal impressed upon the input terminal 29. The output from the oscillator 82 is applied to a circuit including a transistor 83 which functions to provide isolation, amplification and doubling of the wave frequency so as to produce at the output terminal 34 of the audlok receiver a wave having twice the horizontal line repetition rate of 31.5 kilocycles per second. This wave then is applied to the slave sync generator 36 of FIGURE 1 to control its operation synchronously with the matter sync generator 19 and in such phase relation thereto that the composite television signal derived from either of the remote cameras 38 and 39 is in time coincidence at the cross point 44 with television signal derived from either of the central station cameras 14 and 15.

Each of the remote stations may also be provided with audible alarm system so that, in conjunction with the perviously described alarm system at the central station, the clearing of any trouble may be expedited. The remote station alarm system includes a latching type oscillator comprising a transistor 84, the output of which is coupled to a loud speaker 85. By reason of the voltage impressed upon the base of the transistor 84 the oscillator normally is inoperative. However, if the signal voltage at the output of the frequency doubler circuit 81 drops below a predetermined magnitude, such a condition is detected by a circuit including an isolating amplifier comprising a transistor 85. This circuit responds to the decreased voltage and suitably alters the control voltage at the base of the transistor 84 to cause the oscillator to operate, whereby to apply a tone of approximately two kilocycles to the loud speaker 85.

Because the frequency of the sinusoidal wave, which is phase by the phase shifter 59 of FIGURE 1, has a frequency which is double that of the horizontal line repetition rate, a more precise phasing of the audlok signal may be achieved. However, by reason of this double frequency, it requires two complete revolutions of the rotor plate 65 to produce a single horizontal line of phase adjustment. Consequently, as many as several hundred revolutions of the rotor plate 65 may be required to accomplish the desired phasing of the audlok signal. In a practical embodiment of the synchronizing system in accordance with this invention, a motor drive for the rotor plate 65 is provided. The motor operates in either direction so as to advance or retard the phase of the audlok signal as required. In operation, the sync pulses are brought into approximate alignment on the pulse cross monitor 48 by motor drive of the phase shifter 59, after which precise alignment is effected manually. The entire operation has been found to require only about 45 seconds.

Experience with the audlok system of the invention has shown that it is relatively simple to operate, is quite reliable, is less expensive than the convention genlock system, and in some respects provides a facility not ordinarily possible with the genlock system. The audlok system has been especially useful in covering such events as conventions, elections, inaugurations, news and the like.

Although the preceding specification describes the connection at a cross point such as the point 44 of FIGURE 1 of composite television signal derived from camera 14 or from camera 38, for example, another mode of operation of the synchronizing system in accordance with the invention is to apply only the video information derived from camera 38 to the cross point 44. In such a case the synchronizing information is removed from the composite signal derived from camera 38 after it has been applied to terminal 49 for phase comparison with the synchronizing information derived from the master sync generator 19. The synchronizing information of the composite television signal produced at output terminal 18, in such a mode of operation, is derived from the master sync generator 19 regardless of the origin of the video information of the signal.

It also is to be understood submultiples of the horizontal line repetition rate other than the one chosen for illustration may be used as the audlok signal. An essential requirement is that the audlok signal have a frequency which is susceptible of transmission over an ordinary telephone circuit. There are two main requirements of such a telephone circuit, particularly when the circuit is a long one, for the consistent satisfactory operation of the synchronizing system in accordance with the invention. First, the circuit must be capable of passing the audlok signal and second, the circuit should not be of a carriertype in which there is the possibility of reinserting the carrier slightly off frequency.

What is claimed is:

1. In a system for synchronizing television signal generating apparatus located at a remote station with television signal generating apparatus at a central station by means of signals produced at said central station, the combination comprising:

first synchronizing signal generating apparatus at said remote station to control the operation of the video signal generating apparatus at said remote station so as to produce a first composite television signal including video and synchronizing information;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a control wave having an audible frequency integrally related to the frequency of said desired horizontal synchronizing signals;

means for conveying said control wave from said central station to said remote station and said first composite television signal from said remote station to said central station;

means at said remote station responsive to said control wave to control the phase of said first synchronizing signal generator; and means at said central station to adjust the phase of said control wave suitably to effect phase coincidence at said central station of the synchronizing information of said first and second composite television signals.

2. In a system for synchronizing television signal generating apparatus located at a remote station with television signal generating apparatus at a central station by means of signals produced at said central station, the combination comprising:

first synchronizing signal generating apparatus at said remote station to control the operation of the video signal generating apparatus at said remote station so as to produce a first composite television signal including video and synchronizing information;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a control wave having an audible frequency integrally related to the frequency of said desired horizontal synchronizing signals;

means for conveying said control wave from said central station to said remote station and said first composite television signal from said remote station to said central station;

means at said remote station responsive to said control wave to control the phase of said first synchronizing signal generator;

means at said central station responsive to said first and second composite television signals to indicate the phase relationship of the respective synchronizing information of said signals; and means at said central station to adjust the phase of said control wave suitably to effect phase coincidence at said central station of the synchronizing information of said first and second composite television signals.

3. In a system for synchronizing television signal generating apparatus located at a remote station with television signal generating apparatus at a central station by means of signals produced at said central station, the combination comprising:

first synchronizing signal generating apparatus at said remote station to control the operation of the video signal generating apparatus at said remote station said as to produce a first composite television signal including video and synchronizing information;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a control wave having an audible frequency equal to a fraction of the frequency of said desired horizontal synchronizing information;

means including a multichannel communication link between said central station and said remote station for conveying said control wave from said central station to said remote station and said first composite television signal from said remote station to said central station;

means at said remote station responsive to said control wave to control the phase of said first synchronizing signal generator;

means at said central station responsive to said first and second composite television signals to indicate the phase relationship of the respective synchronizing information of said signals; and means at said central station to shift the phase of said control wave suitably to effect phase coincidence at said central station of the synchronizing information of said first and second composite television signals.

4. In a system for synchronizing television signal generating apparatus located at a remote station with television signal generating apparatus at a central station by means of signals produced at said central station, the combination comprising:

first synchroniding signal generating apparatus at said remote station to control the operation of the video signal generating apparatus at said remote station so as to produce a first composite television signal including video and synchronizing information;

means for conveying said first composite television signal from said remote station to said central station;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a sinusoidal wave having a frequency equal to one-fourth of the frequency of said desired horizontal synchronizing information;

means for conveying said sinusoidal wave from said central station to said remote station;

means at said remote station responsive to said sinusoidal signal generator;

means at said central station responsive to said first and second composite television signals to indicate the phase relationship of the respective synchronizing information of said signals; and means at said central station to shift the phase of said sinusoidal wave suitably to effect phase coincidence at said central station of the synchronizing information of said first and second composite television signals.

5. In a system for synchronizing television signal generating apparatus located at a remote station with television signal generating apparatus at a central station by means of signals produced at said central station, the combination comprising:

first synchronizing signal generating apparatus at said remote station to control the operation of the video signal generating apparatus at said remote station so as to produce a first composite television signal including video and synchronizing information;

means for conveying said first composite television signal from said remote station to said central station;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a first sinusoidal wave having twice the frequency of said desired horizontal synchronizing information;

means at said central station responsive to said first sinusoidal wave to produce a second sinusoidal wave having a frequency equal to one-fourth of the frequency of said desired horizontal synchronizing information;

means for conveying said second sinusoidal wave from said central station to said remote station;

means at said remote station responsive to said second sinusoidal wave to control the phase of said first synchronizing signal generator;

means at said central station responsive to said first and second composite television signals to indicate the phase relationship of the respective synchronizing information of said signals; and means at said central station to shift the phase of said first sinusoidal wave suitably to effect phase coincidence at said central station of the synchronizing information of said first and second composite television signals.

6. In a system for synchronizing television signal generating apparatus located at a remote station with television signal generating apparatus at a central station by means of signals produced at said central station, the combination comprising:

means at said remote station including an oscillator to develop a first sinusoidal wave having the frequency of desired horizontal synchronizing information;

means at said remote station responsive to said first sinusoidal wave to control the operation of the video signal generating apparatus at said remote station so as to produce a first composite television signal including video and synchronizing information;

means including a relatively high frequency responsive channel for conveying said first composite television signal from said remote station to said central station;

means at said central station to develop a train of pulses having twice the repetition rate of said desired horizontal synchronizing information;

means at said central station responsive to said train of pulses to control the operation of the video signal generating apparatus at said central station so as to produce a second composite television signal including video and synchronizing information;

means at said central station to convert said train of pulses to a second sinusoidal wave having twice the frequency of said desired horizontal synchronizing information;

means at said central station including a frequency divider responsive to said second sinusoidal wave to produce a third sinusoidal wave to produce a third sinusoidal wave having a frequency equal to one-fourth of the frequency of said desired horizontal synchronizing information;

means including a relatively low frequency responsive channel for conveying said third sinusoidal wave from said central station to said remote station;

means at said remote station including a frequency doubler responsive to said third sinusoidal wave to produce a fourth sinusoidal wave having a frequency equal to one-half of the frequency of said desired horizontal synchronizing information;

means at said remote station to impress said fourth sinusoidal wave upon said oscillator so as to lock said oscillator in a predetermined phase relation to said third sinusoidal wave;

means at said central station responsive to said first and second composite television signals to indicate the phase relationship of the respective synchronizing information of said signals; and means at said central station to shift the phase of said second sinusoidal wave suitably to effect phase coincidence at said central station of the synchronizing information of said first and second composite television signals.

7. In a system for synchronizing television signal generating apparatus located at a remote station with television signal generating apparatus at a central station by means of signals produced at said central station, the combination comprising:

first synchronizing signal generating apparatus at said remote station responsive to said first sinusoidal wave to control the operation of the signal generating apparatus at said remote station so as to produce a first composite television signal including video and synchronizing information;

second synchronizing signal generating apparatus at said central station to control the operation of the signal generating apparatus at said central station so as to produce a second composite television signal including video and vertical and horizontal synchronizing information;

means at said central station responsive to said second synchronizing signal generating apparatus to produce a train of pulses having twice the repetition rate of said second horizontal synchronizing signal;

means at said central station responsive to said train of pulses to produce a sinusoidal wave having a frequency equal to one-fourth of the frequency of said horizontal synchronizing information;

means at said remote station responsive to said sinusoidal wave having a frequency equal to one-fourth of the frequency of said horizontal synchronizing information;

means at said remote station responsive to said sinusoidal wave to control the phase of said first synchronizing signal generator;

detecting means at said central station having an input circuit to receive the synchronizing information of said first and second composite television signals and an output circuit to produce a control signal representative of any lack of phase coincidence of the synchronizing information of said first and second television signals; and an alarm responsive to said control signal.

8. In a system for synchronizing television signal generating apparatus located at a remote station with television signal generating apparatus at a central station by means of signals produced at said central station, the combination comprising:

first synchronizing signal generating apparatus at said remote station responsive to said first sinusoidal wave to control the operation of the video signal generating apparatus at said remote station so as to produce a first composite television signal including video and synchronizing information;

means for conveying said first composite television signal from said remote station to said central station;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a sinusoidal wave having a frequency equal to one-fourth of the frequency of said desired horizontal synchronizing information;

means for conveying said sinusoidal wave from said central station to said remote station;

means at said remote station responsive to said sinusoidal wave to control the phase of said first synchronizing signal generator;

means at said central station to produce pulses of an alternating current wave;

control means at said central station having a first input to receive said pulses, a second input and an output;

detecting means at said central station having an input circuit to receive the synchronizing information of said first and second composite television signals and an output circuit to produce a control signal representative of any lack of phase coincidence of the synchronizing information of said first and second television signals;

means coupling the output circuit of said detecting means to the second input of said control means, whereby to produce an actuating signal in the output of said control means in response to said control signal; and an alarm responsive to said actuating signal.

9. In a system for synchronizing television signal generating apparatus located at a remote station with television signal generating apparatus at a central station by means of signals produced at said central station, the combination comprising:

means at said remote station including an oscillator to develop a first sinusoidal wave having the frequency of desired horizontal synchronizing information;

means at said remote station responsive to said first sinusoidal wave to control the operation of the video signal generating apparatus at said remote station so as to produce a first composite television signal including video and synchronizing information;

means including a relatively high frequency responsive channel for conveying said first composite television signal from said remote station to said central station;

means at said central station to develop a train of pulses having twice the repetition rate of said desired horizontal synchronizing information;

means at said central station responsive to said train of pulses to control the operation of the video signal generating apparatus at said central station so as to produce a second composite television signal including video and synchronizing information;

means at said central station to convert said train of pulses to a second sinusoidal wave having twice the frequency of said desired horizontal synchronizing information;

means at said central station including a frequency divider responsive to said second sinusoidal wave to produce a third sinusoidal wave having a frequency equal to one-fourth of the frequency of said desired horizontal synchronizing information;

means including a relatively low frequency responsive channel for conveying said third sinusoidal wave from said central station to said remote station;

means at said remote station including a frequency doubler responsive to said third sinusoidal wave to produce a fourth sinusoidal wave having a frequency equal to one-half of the frequency of said desired horizontal synchronizing information;

means at said remote station to impress said fourth sinusoidal wave upon said oscillator so as to lock said oscillator in a predetermined phase relation to said third sinusoidal wave;

means at said central station to shift the phase of said second sinusoidal wave suitably to effect phase coincidence at said central station of the synchronizing information of said first and second composite television signals;

means at said central station including a squegging type oscillator to produce pulses of an alternating current wave;

means at said central station including a balanced modulator having a first input to receive said pulses, a second input and an output;

means at said central station including a transformer having a primary winding provided with terminals to receive respectively the synchronizing information of said first and second composite television signals and a secondary winding in which to produce a control signal representative of a lack of phase coincidence of the synchronizing information of said first and second television signals;

means coupling said transformer secondary winding to said second modulator input, whereby to produce an actuating signal in said modulator output only in response to said control signal; and an alarm device responsive to said actuating signal.

10. In a system for synchronizing television signal generating apparatus located respectively at a plurality of remote stations with television signal generating apparatus at a central station by means of signals produced at said central station, the combination comprising:

first synchronizing signal generating apparatus at each of said remote stations to control the operation of the video signal generating apparatus at said respective remote stations so as to produce at each remote station a first composite television signal including video and synchronizing information;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a control wave having an audible frequency integrally related to the frequency of said desired horizontal synchronizing information;

means at each of said remote stations responsive to said control wave to control the phase of the first synchronizing signal generator at that remote station;

means at said central station responsive selectively to said plurality of first and second composite television signals to indicate the phase relationship of the respective synchronizing information of said signals; and means at said central station to individually adjust the phase of each of said control waves suitably to effect phase coincidence of the synchronizing information of said plurality of first and second composite television signals.

11. In a system for synchronizing television signal generating apparatus located respectively at a plurality of remote stations with television signal generating apparatus at a central station by means of signals produced at said central station, the combination comprising:

first synchronizing signal generating apparatus at each of said remote stations to control the operation of the video signal generating apparatus at said respective remote stations so as to produce at each remote station a first composite television signal including video and synchronizing information;

second synchronizing signal generating apparatus at said central station to control the operation of the video signal generating apparatus at said central station so as to produce a second composite television signal including video and synchronizing information;

means at said central station responsive to said second synchronizing signal generating apparatus to produce a control wave having an audible frequency integrally related to the frequency of said desired horizontal synchronizing information;

means at each of said remote stations responsive to said control wave to control the phase of the first synchronizing signal generator at that remote station;

detecting means at said central station having a plurality of input circuits to receive individually the synchronizing information of said respective first composite television signals and to receive collectively the synchronizing information of said second composite television, said detecting means also having a plurality of output circuits to produce respective control signals representative of any lack of phase coincidence of the synchronizing information of said first and second television signals received thereby; and an alarm responsive to said respective control signals to indicate said lack of phase coincidence and to identify the remote station source of the noncoincident synchronizing information.

References Cited

UNITED STATES PATENTS

| | | | |
|---|---|---|---|
| 2,753,396 | 7/1956 | Gore | 178—69.5 |
| 3,311,702 | 3/1967 | Legler | 178—69.5 |

ROBERT L. GRIFFIN, *Primary Examiner.*

ROBERT L. RICHARDSON, *Assistant Examiner.*

U.S. Cl. X.R.

328—155

UNITED STATES PATENT OFFICE
CERTIFICATE OF CORRECTION

Patent No. 3,424,866 January 28, 1969

Jarrett L. Hathaway

It is certified that error appears in the above identified patent and that said Letters Patent are hereby corrected as shown below:

Column 8, lines 58 and 59, after "sinusoidal" insert -- wave to control the phase of said first synchronizing --. Column 10, lines 42 to 45, cancel "means at said remote station responsive to said sinusoidal wave having a frequency equal to one-fourth of the frequency of said horizontal synchronizing information;". Column 13, line 14, after "television" insert -- signal --.

Signed and sealed this 24th day of March 1970.

(SEAL)
Attest:

Edward M. Fletcher, Jr.
Attesting Officer

WILLIAM E. SCHUYLER, JR.
Commissioner of Patents